United States Patent
Son et al.

(10) Patent No.: US 10,132,977 B2
(45) Date of Patent: Nov. 20, 2018

(54) WIRE GRID POLARIZER PLATE AND METHOD FOR MANUFACTURING THE SAME

(71) Applicant: Samsung Display Co., Ltd., Yongin, Gyeonggi-do (KR)

(72) Inventors: Jung Ha Son, Seoul (KR); Jae Neung Kim, Seoul (KR); Yong Hwan Ryu, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 166 days.

(21) Appl. No.: 15/048,076

(22) Filed: Feb. 19, 2016

(65) Prior Publication Data
US 2017/0068032 A1    Mar. 9, 2017

(30) Foreign Application Priority Data
Sep. 3, 2015 (KR) .................. 10-2015-0124662

(51) Int. Cl.
G02B 5/30 (2006.01)
(52) U.S. Cl.
CPC .................. G02B 5/3058 (2013.01)
(58) Field of Classification Search
CPC ...... G02B 5/30; G02B 5/3025; G02B 5/3033; G02B 5/3041; G02B 5/3058; G02B 27/28
USPC .......................... 359/485.01, 485.05, 487.03
See application file for complete search history.

(56) References Cited

U.S. PATENT DOCUMENTS

2014/0016197 A1* 1/2014 Davis ..................... B82Y 20/00
359/485.05
2014/0300964 A1* 10/2014 Davis ................... G02B 5/3058
359/485.05

FOREIGN PATENT DOCUMENTS

| KR | 1020120101618 A | 9/2012 |
| KR | 1020130126391 A | 11/2013 |
| KR | 1020140007648 A | 1/2014 |

OTHER PUBLICATIONS

KR 10-2014-0007648, English Language Machine Translation, Created via Korean Patent Information Online Network on Sep. 12, 2017.*

* cited by examiner

*Primary Examiner* — Stephone B Allen
*Assistant Examiner* — Adam W Booher
(74) *Attorney, Agent, or Firm* — Cantor Colburn LLP

(57) ABSTRACT

A wire grid polarizer plate includes: a transparent substrate through which incident light is transmitted; and a partition wall member on the transparent substrate and at which first polarized light is transmitted and second polarized light perpendicular to the first polarized light is reflected. The partition wall member is defined by: first partition walls spaced apart from each other on the transparent substrate, the first partition walls formed of a first metal; second partition walls respectively on the first partition walls, the second partition walls formed of a second metal having strength greater than that of the first metal; and third reinforced partition walls respectively on the second partition walls and having a stepped cross-sectional structure, the third partition walls formed of an oxide of the first metal, the oxide of the first metal having strength greater than the strength of the second metal.

9 Claims, 18 Drawing Sheets

WIRE GRID POLARIZER PLATE AND METHOD FOR MANUFACTURING THE SAME

This application claims priority to Korean Patent Application No. 10-2015-0124662 filed on Sep. 3, 2015, and all the benefits accruing therefrom under 35 U.S.C. § 119, the content of which in its entirety is herein incorporated by reference.

BACKGROUND

1. Field

The invention relates to a wire grid polarizer plate and a method for manufacturing the same.

2. Description of the Related Art

Generally, a parallel conducting wire array is referred to as a wire grid in which parallel conducting wires are arranged in order to polarize only specific polarized light in electromagnetic waves.

A wire grid structure having a period smaller than the wavelength of a light has polarization characteristics to reflect polarized light in a direction of the wires and transmit polarized light perpendicular to the direction of the wires with respect to non-polarized incident light. This structure has an advantage of being able to reuse the reflected polarized light compared with an absorption type polarizer.

SUMMARY

The invention provides a wire grid polarizer plate having a relatively high degree of polarization, high transmittance and high brightness gain.

The invention also provides a method for manufacturing a wire grid polarizer plate with improved processability.

According to an exemplary embodiment of the invention, a wire grid polarizer plate includes: a transparent substrate through which incident light is transmitted; and a partition wall member which protrudes from the transparent substrate and at which, among the incident light transmitted through the transparent substrate, first polarized light is transmitted and second polarized light perpendicular to the first polarized light is reflected. The partition wall member is defined by a first partition wall provided in plural spaced apart from each other on the transparent substrate, the first partition wall formed from a first metal; a second partition wall provided in plural respectively on the first partition walls, the second partition wall formed of a second metal having strength greater than that of the first metal; and a third reinforced partition wall provided in plural respectively on the second partition walls and having a stepped cross-sectional structure, the third reinforced partition wall formed of an oxide of the first metal, the oxide of the first metal having strength greater than the strength of the second metal.

According to another exemplary embodiment of the invention, a method for manufacturing a wire grid polarizer plate includes: forming a first material layer including a first metal, on a transparent substrate; forming on the first material layer, a second material layer including a second metal having strength greater than that of the first metal; forming on the second material layer, a third material layer including an oxide of the first metal; forming from the third material layer, a third partition wall provided in plural spaced apart from each other on the second material layer by patterning the third material layer using a mask; and forming from the third partition walls, a third reinforced partition wall provided in plural and including the oxide of the first metal, the third reinforcing partition walls having strength greater than the strength of the second metal and having a stepped cross-sectional structure by heat treatment of the third partition walls.

The wire grid polarizer plate according to an exemplary embodiment of the invention provides a relatively high degree of polarization, high transmittance and high brightness gain.

In the method for manufacturing a wire grid polarizer plate according to the invention, the first material layer, the second material layer, the third material layer and the third reinforced partition walls can be formed by a continuous deposition process to improve processability by simplifying a manufacturing process of the wire grid polarizer plate.

Other features and exemplary embodiments will be apparent from the following detailed description, the drawings, and the claims.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
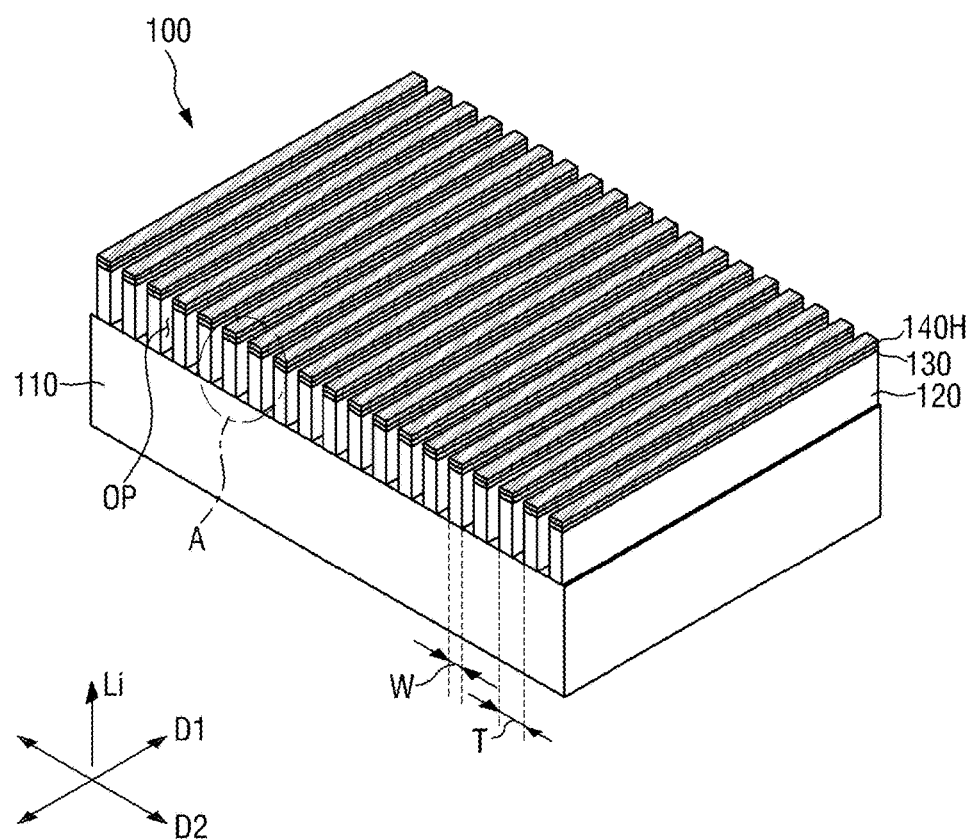
FIG. 1 is a schematic perspective view of an exemplary embodiment of a wire grid polarizer plate according to the invention.

Features of the invention and methods of accomplishing the same may be understood more readily by referencing the following detailed description of exemplary embodiments and the accompanying drawings. The invention may, however, be embodied in many different forms and are not limited to the exemplary embodiments set forth herein. Rather, these exemplary embodiments are provided to help illustrate the invention to those of ordinary skill in the art.

In the drawings, the thickness of layers and regions are exaggerated for clarity. It will be understood that when an element or layer is referred to as being "on," "connected to" or "coupled to" another element or layer, the element or layer may be directly on, connected or coupled to another element or layer, or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections are not limited by these terms.

These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially related terms, such as "below," "lower," "under," "above," "upper" and the like, may be used herein for ease of description to describe the relationship of one element or feature to another element(s) or feature(s) as illustrated in the figures. It will be understood that the spatially related terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially related descriptors used herein may be interpreted accordingly.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features.

Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments of the present disclosure are described hereinafter with reference to the accompanying drawings.

Figure 2:
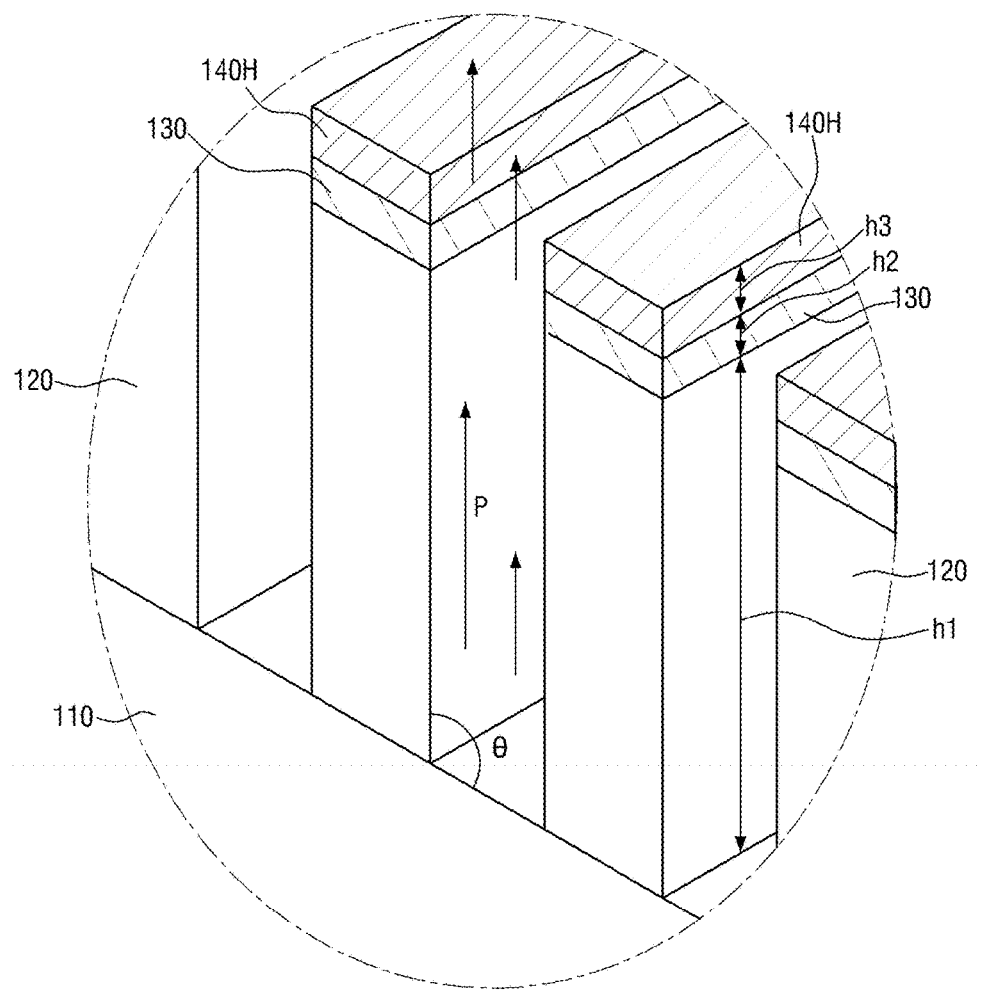
FIG. 2 is an enlarged view of a region A of FIG. 1.

FIG. 1 is a schematic perspective view of an exemplary embodiment of a wire grid polarizer plate 100 according to the invention. FIG. 2 is an enlarged view of a region A of FIG. 1. Hereinafter, the wire grid polarizer plate 100 will be described with reference to FIGS. 1 and 2.

The wire grid polarizer plate 100 includes a transparent substrate 110, a first partition wall 120 provided in plural, a second partition wall 130 provided in plural and a third reinforced partition wall 140H provided in plural. The first, second and third partition wall 120, 130 and 140H may together define a whole of an individual partition wall, and the first, second and third partition walls 120, 130 and 140H may together define a whole of a partition wall member on the transparent substrate 110.

Where the transparent substrate 110 can transmit visible light, a material for the transparent substrate 110 may be selected appropriately according to the use or process of the wire grid polarizer plate 100. In an exemplary embodiment, for example, as the transparent substrate 110, various relatively high molecular compounds such as glass, quartz, acryl, triacetylcellulose ("TAC"), cyclic olefin copolymer ("COC"), cyclic olefin polymer ("COP"), polycarbonate ("PC"), polyethylene naphthalate ("PET"), polyimide ("PI"), polyethylene naphthalate ("PEN"), polyether sulfone ("PES") and polyarylate ("PAR") may be used, but is not limited thereto. The transparent substrate 110 may include or be formed of an optical film base material having predetermined flexibility.

The first partition walls 120 may be disposed to be spaced apart from each other on the transparent substrate 110 and define an opening OP respectively therebetween. The first partition walls 120 are disposed to lengthwise extend longitudinally in the first direction D1 and to be spaced apart from each other at a predetermined interval in the second direction D2 perpendicular to the first direction D1. Light Li incident on the wire grid polarizer plate 100 in a third direction (labeled Li) is polarized by the first partition walls 120.

The first partition walls 120 spaced apart from each other at a predetermined interval transmit first polarized light of the incident light Li and reflect second polarized light perpendicular to the first polarization. Specifically, within the incident light Li, an S wave which is a polarization component parallel to the extending direction (i.e., first direction D1) of the first partition walls 120 is reflected by the first partition walls 120, and a P wave which is a polarization component parallel to a direction (i.e., second direction D2) orthogonal to the extending direction of the first partition walls 120 is transmitted as being recognized as an effective refractive medium.

In an exemplary embodiment, for example, the first partition walls 120 may have a total line width W equal to or less than about 100 nanometers (nm), a maximum thickness h1 equal to or greater than about 150 nm, and a spacing interval T equal to or less than about 100 nm, but not being limited thereto.

The first partition walls 120 may include or be made of first metal, and the first metal may be, for example, one of aluminum (Al), chromium (Cr), gold (Au), silver (Ag), copper (Cu), nickel (Ni), an alloy thereof and a combination of the foregoing. In one exemplary embodiment, the first partition walls 120 may include or be formed of aluminum, but are not limited thereto.

An angle θ between the first partition walls 120 and the transparent substrate 110 may range from about 88 degrees (°) to about 90°. That is, the first partition walls 120 are protruded from the transparent substrate 110 to be substantially perpendicular to the transparent substrate 110. That is, the first partition walls 120 have a substantially vertical etch profile.

As the angle θ between the first partition walls 120 and the transparent substrate 110 becomes relatively large, that is, as the first partition walls 120 are formed substantially vertically with respect to the transparent substrate 110, the optical characteristics such as brightness gain, transmittance and polarization of the wire grid polarizer plate 100 are improved. The wire grid polarizer plate 100 may have polarization of about 99.99% or more, transmittance of about 42% or more and brightness gain of about 1.3 or more by the first partition walls 120 disposed to be substantially perpendicular to the transparent substrate 110.

The second partition walls 130 may be disposed on the first partition walls 120. The second partition walls 130 may serve as a capping layer for reducing or effectively preventing a hillock that can be generated in the bonding surface with the first partition walls 120.

The second partition walls 130 may include or be formed of second metal having strength greater than that of the first metal. The second metal may include or be formed of, for example, one of titanium (Ti), cobalt (Co), molybdenum (Mo), an alloy thereof and a combination of the foregoing. In one exemplary embodiment, the second partition walls 130 may include or be formed of titanium (Ti).

The third reinforced partition walls 140H are disposed on the second partition walls 130. In an exemplary embodiment of manufacturing the wire grid polarizer plate 100, the third reinforced partition walls 140H may serve as a hard mask for forming the first partition walls 120 and the second partition walls 130. The third reinforced partition walls 140H allow the first partition walls 120 and the second partition walls 130 to be formed to be substantially perpendicular to the transparent substrate 110. The third reinforced partition walls 140H may remain in wire grid polarizer plate 100 after manufacturing thereof, but is not limited thereto.

The third reinforced partition walls 140H may include or be formed of an oxide of the first metal having strength greater than that of the second metal. The oxide of the first metal may be, for example, aluminum oxide, chromium oxide, copper oxide, nickel oxide or the like. In one exemplary embodiment, the third reinforced partition walls 140H may include or be formed of, but not limited to, aluminum oxide.

In exemplary embodiments, for example, a ratio of a maximum thickness h2 of the second partition walls 130 to a maximum thickness h1 of the first partition walls 120 may be equal to or greater than about 0.05 and equal to or less than about 0.1. The line width W of the second partition walls 130 may be about 100 nm or less, and the spacing interval T of the second partition walls 130 may be about 100 nm or less.

In exemplary embodiments, for example, a ratio of a maximum thickness h3 of the third reinforced partition walls 140H to a maximum thickness h1 of the first partition walls 120 may be equal to or greater than about 0.05 and equal to or less than about 0.1. The line width W of the third reinforced partition walls 140H may be about 100 nm or less, and the spacing interval T of the third reinforced partition walls 140H may be about 100 nm or less.

FIGS. 3 to 10 are cross-sectional views schematically showing processes in an exemplary embodiment of manufacturing a wire grid polarizer plate such as the wire grid polarizer plate 100 (see FIGS. 1 and 2) according to the invention.

Figure 3:
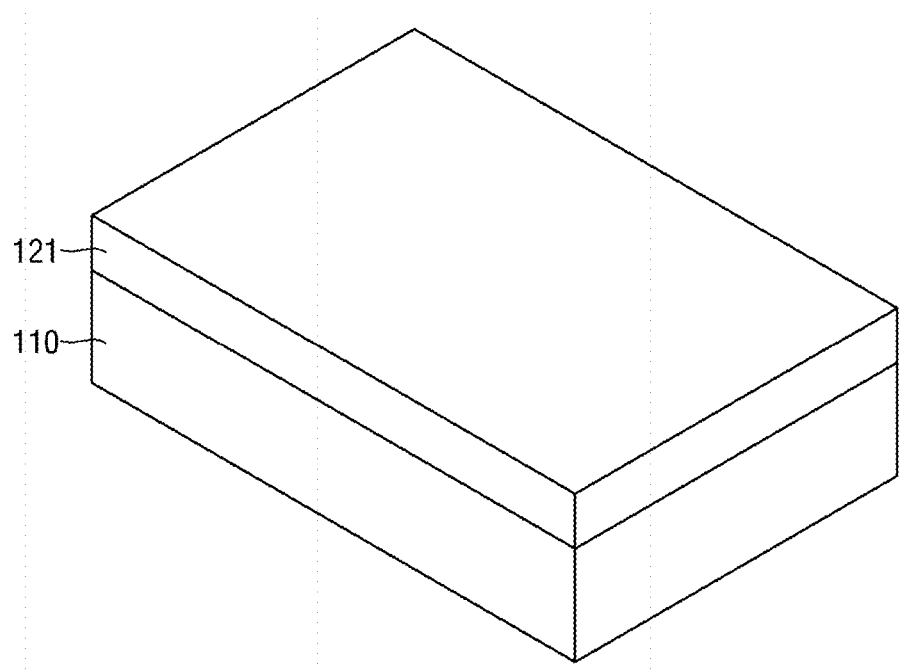
FIGS. 3 to 10 schematically show processes in an exemplary embodiment of manufacturing a wire grid polarizer plate according to the invention.

Referring to FIG. 3, a first material layer 121 may be formed on the transparent substrate 110 such as by using a physical vapor deposition method (e.g., sputtering method).

Where the transparent substrate 110 can transmit visible light, a material for the transparent substrate 110 may be selected appropriately according to the use or process of the wire grid polarizer plate 100. In an exemplary embodiment, for example, as the transparent substrate 110, various relatively high molecular compounds such as glass, quartz, acryl, triacetylcellulose ("TAC"), cyclic olefin copolymer ("COC"), cyclic olefin polymer ("COP"), polycarbonate ("PC"), polyethylene naphthalate ("PET"), polyimide ("PI"), polyethylene naphthalate ("PEN"), polyether sulfone ("PES") and polyarylate ("PAR") may be used, but is not limited thereto. The transparent substrate 110 may include or be formed of an optical film base material having predetermined flexibility.

In an exemplary embodiment, for example, the first material layer 121 may be formed of a first metal. The first metal may be, for example, one of aluminum (Al), chromium (Cr), gold (Au), silver (Ag), copper (Cu), nickel (Ni), an alloy thereof and a combination of the foregoing. In one exemplary embodiment, the first partition walls 120 may be formed of aluminum, but are not limited thereto.

In an exemplary embodiment, for example, the first material layer 121 may be formed by placing the transparent substrate 110 and a first metal target serving as a sputtering target material, respectively, on an anode and a cathode disposed to face each other in a sputter chamber, generating a plasma by applying a voltage to the anode and the cathode in a vacuum state after injecting an inert gas into the sputter chamber, and depositing atoms or ions sputtered from the sputtering target material on the transparent substrate 110.

Figure 4:
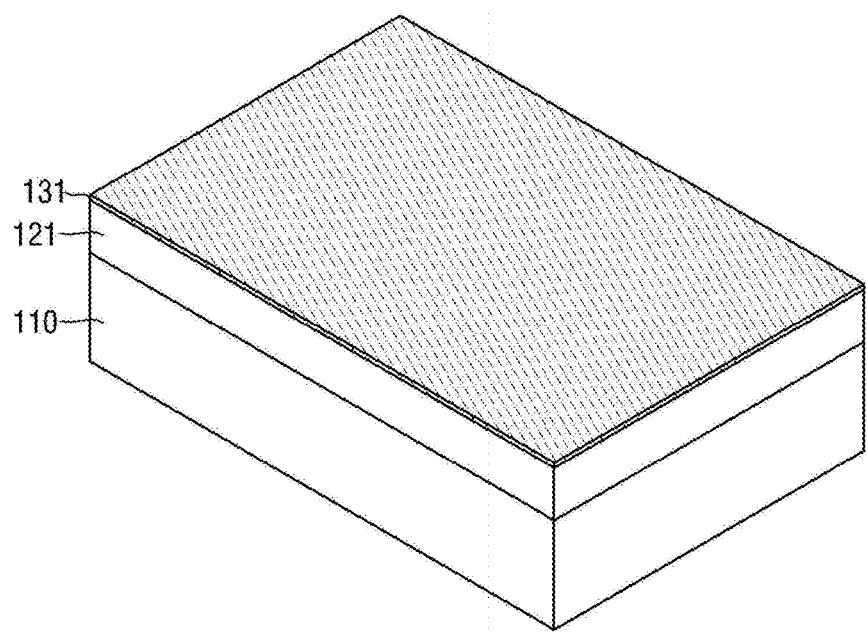

Referring to FIG. 4, a second material layer 131 may be formed on the first material layer 121 such as by using a physical vapor deposition method (e.g., sputtering method). In an exemplary embodiment, for example, the second material layer 131 may be formed of a second metal having strength greater than that of the first metal. The second metal may be formed of, for example, one of titanium (Ti), cobalt (Co), molybdenum (Mo), an alloy thereof and a combination of the foregoing. In an exemplary embodiment, the second metal may be titanium.

In an exemplary embodiment, for example, the second material layer 131 may be formed by placing the transparent substrate 110 including the first material layer 121 thereon and a second metal target serving as a sputtering target material, respectively, on the anode and the cathode disposed to face each other in the sputter chamber, generating a plasma by applying a voltage to the anode and the cathode in a vacuum state after injecting an inert gas into the sputter chamber, and depositing atoms or ions sputtered from the sputtering target material on the transparent substrate 110.

Figure 5:
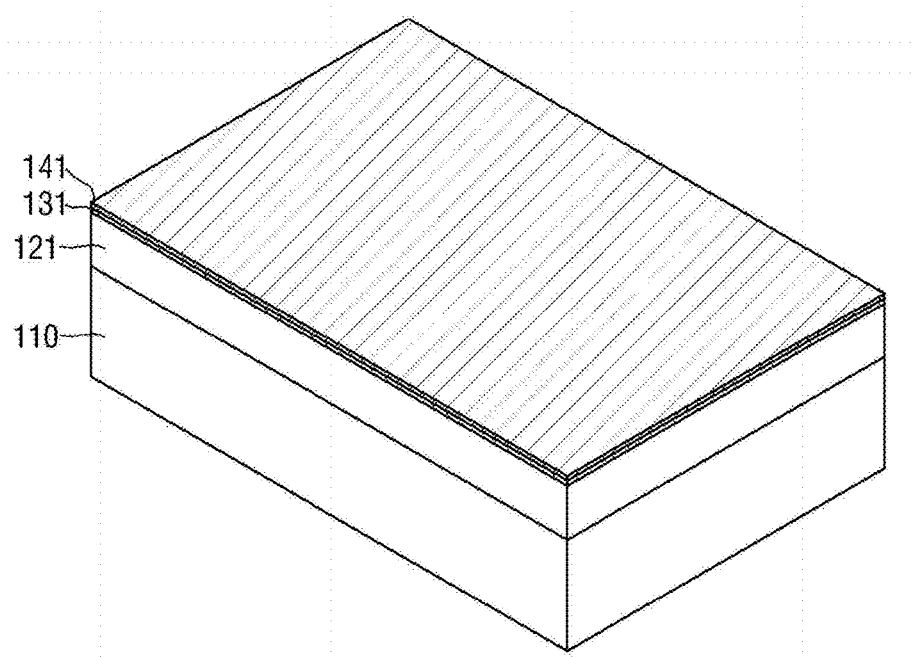
Figure 6:
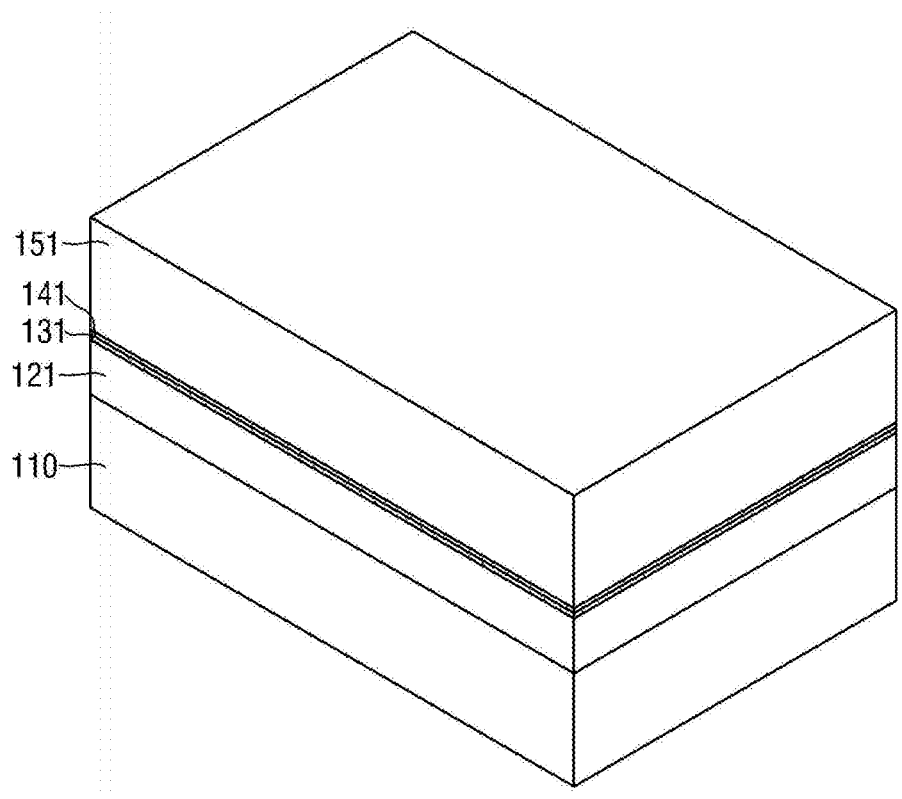
Figure 7:
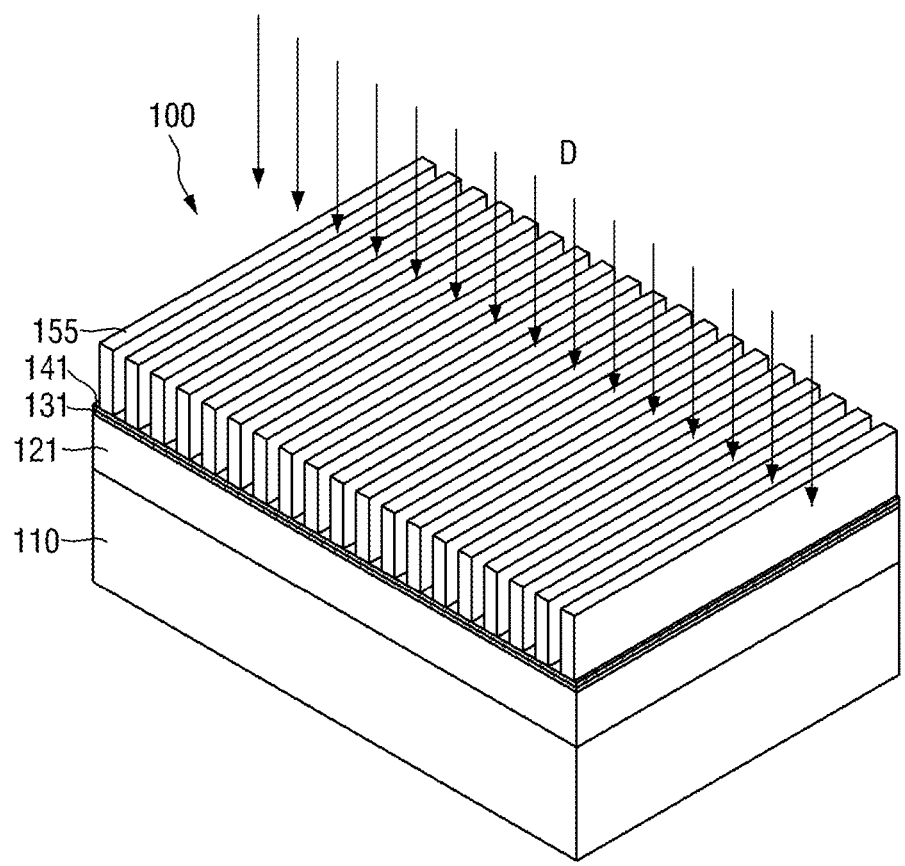
Figure 8:
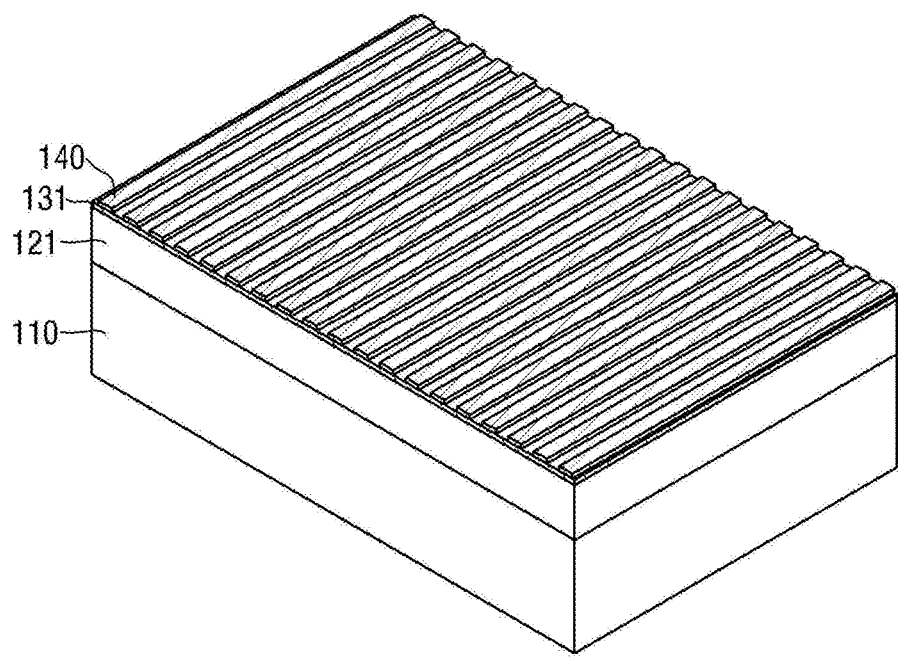

Referring to FIG. 5, a third material layer 141 may be formed on the second material layer 131 such as by using a physical vapor deposition method (e.g., sputtering method). In an exemplary embodiment, for example, the third material layer 141 may be formed of an oxide of the first metal. The oxide of the first metal may be formed of, for example, aluminum oxide, chromium oxide, copper oxide, nickel oxide or the like. In an exemplary embodiment, the third material layer 141 may be formed of, but not limited to, aluminum oxide.

In an exemplary embodiment, for example, the third material layer 141 may be formed by placing the transparent substrate 110 including the first material layer 121 and the second material layer 131 thereon and a first metal target serving as a sputtering target material, respectively, on the anode and the cathode disposed to face each other in the sputter chamber, generating a plasma by applying a voltage to the anode and the cathode in a vacuum state after injecting an inert gas and an oxygen gas into the sputter chamber, and depositing oxygen ions and atoms or ions sputtered from the sputtering target material on the transparent substrate 110.

Referring to FIGS. 6 to 9, after forming a photoresist layer 151 by coating and exposing photosensitive resin on the third material layer 141 such as by using a photolithography method, a photomask 155 may be formed by developing and etching the photoresist layer 151. The photomask 155 may be collectively defined by a photosensitive resin partition wall provided in plural spaced apart from each other. The photosensitive resin partition walls may be spaced apart from each other at an interval (refer to T in FIG. 1) of about 100 nm or less.

Third partition walls 140 may be formed by placing the photomask 155 on the third material layer 141, irradiating a gas plasma D to the photomask 155 (see downward arrows in FIG. 7), and etching a portion of the third material layer 141 not covered by the photomask 155. As a result of patterning the third material layer 141, the third partition walls 140 may be formed to be spaced apart from each other on the second material layer 131. In an exemplary embodiment, for example, the third partition walls 140 may be spaced apart from each other at an interval of about 100 nm or less.

Figure 9:
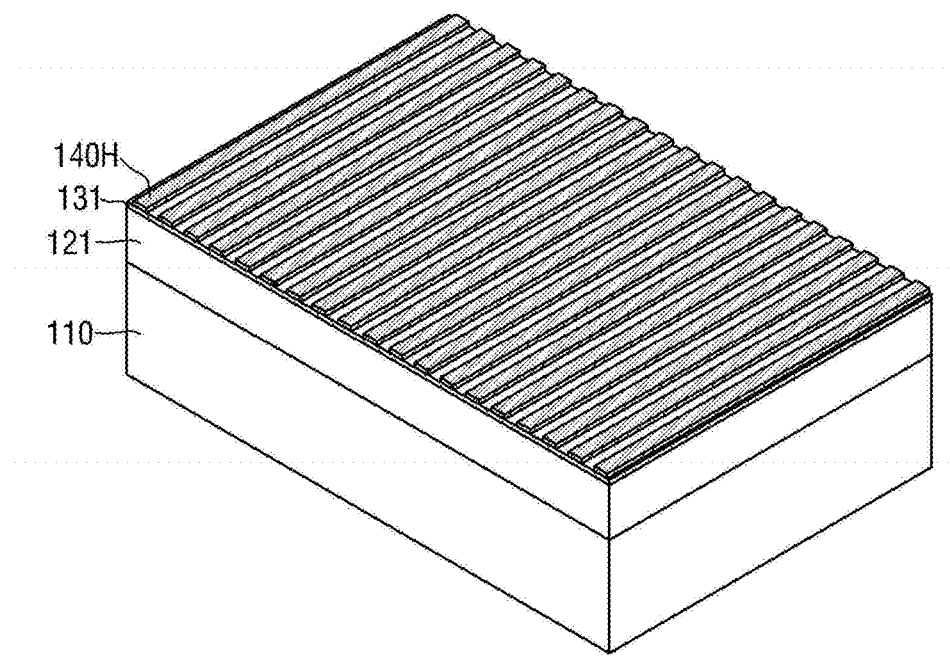
Figure 10:
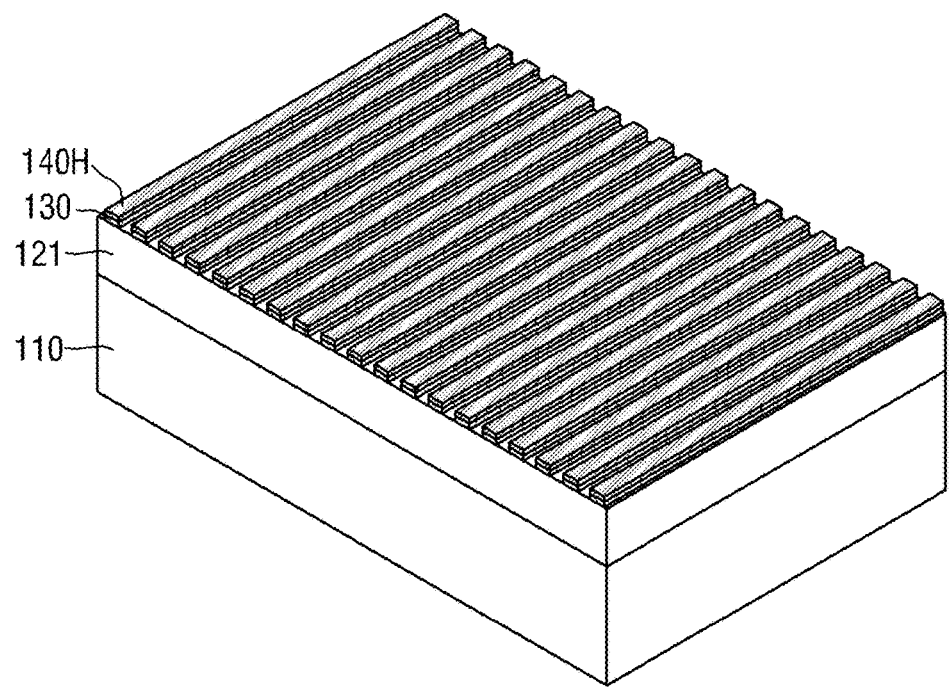

FIG. 9 illustrates a process and result of changing a crystal structure of the third partition walls 140 such as through a heat treatment process to form third reinforced partition walls 140H. FIG. 10 schematically shows a process and result of patterning the second material layer 131 by using the third reinforced partition walls 140H, which are resultant products of the heat treatment process, as a mask.

Referring to FIGS. 9 and 10, a heat treatment process may change the crystal structure of the third partition walls 140, thereby improving etching resistance thereof. By using the third reinforced partition walls 140H as a mask, the second material layer 131 may be patterned to form the second partition walls 130.

Referring to FIGS. 1 and 10, the first material layer 121 may be patterned by using the second partition walls 130 as a mask to form the first partition walls 120, thereby manufacturing the wire grid polarizer plate 100 (see FIG. 1).

As the etching resistance of the third partition walls 140 increases, a function of the third reinforced partition walls 140H as a relatively hard mask for patterning respective material layers for forming the first partition walls 120 (see FIG. 1) and the second partition walls 130 is improved, thereby providing a substantially vertical etch profile to the first partition walls 120 and the second partition walls 130. As used herein, the third partition walls 140 whose etching resistance is enhanced by the heat treatment process are defined as the third reinforced partition walls 140H.

In an exemplary embodiment of the method of manufacturing a wire grid polarizer plate according to the invention, the processes of forming the first material layer 121, the second material layer 131 and the third material layer 141 and forming the first partition walls 120, the second partition walls 130 the third partition walls 140 and the third reinforced partition walls 140H may be performed continuously in one sputter chamber. Where the above-described processes are performed continuously in one sputter chamber, there is an effect of improving the processability and the etch profile compared to a conventional method of using semi-metal oxide as a hard mask.

In a conventional method of manufacturing a wire grid polarizer plate, a semi-metal oxide (e.g., silicon oxide (SiOx)) is used as a hard mask. After moving the transparent substrate 110 having the first material layer 121 (see FIG. 4) and the second material layer 131 (see FIG. 4) thereon, to a chemical vapor deposition chamber from the sputter chamber, a film of semi-metal oxide is formed on the second material layer 131 (see FIG. 4) such as by using a chemical vapor deposition method, which undesirably increases the number of processes to thereby reduce the processability.

Further in the conventional method of manufacturing the wire grid polarizer plate, while moving the transparent substrate 110 having the first material layer 121 (see FIG. 4) and the second material layer 131 (see FIG. 4) thereon, to the chemical vapor deposition chamber from the sputter chamber, an oxide film may be generated on the first material layer 121 (see FIG. 4) and the second material layer 131 (see FIG. 4). The oxide film may undesirably degrade the etch profile of the first partition walls 120 and the second partition walls 130 in a patterning process for forming the first partition walls 120 and the second partition walls 130.

In exemplary embodiments of the method of manufacturing the wire grid polarizer plate, the heat treatment process may be performed for more than one hour at a temperature equal to or greater than about 600 degrees Celsius (° C.). In this regard, as an example where the third material layer 141 (see FIG. 5) is heat-treated to form the third reinforced partition walls 140H including an aluminum oxide, FIGS. 11 to 20 show micrographs of a surface structure of the heat-treated aluminum oxide material layer in a top plan view thereof after the heat treatment process and cross-sectional profiles of the heat-treated aluminum oxide material layer ($Al_2O_3$) taken along a planar distance in nm (e.g., 1000 nm).

Figure 11:
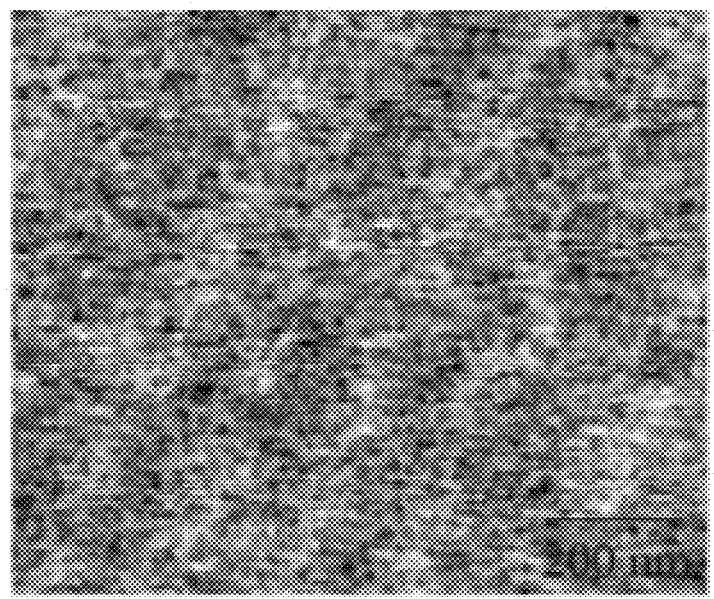
FIG. 11 is a micrograph of third reinforced partition walls which have been heat-treated for one hour at a temperature of 500 degrees Celsius (° C.) in another exemplary embodiment of a method for manufacturing a wire grid polarizer plate according to the invention.
Figure 12:
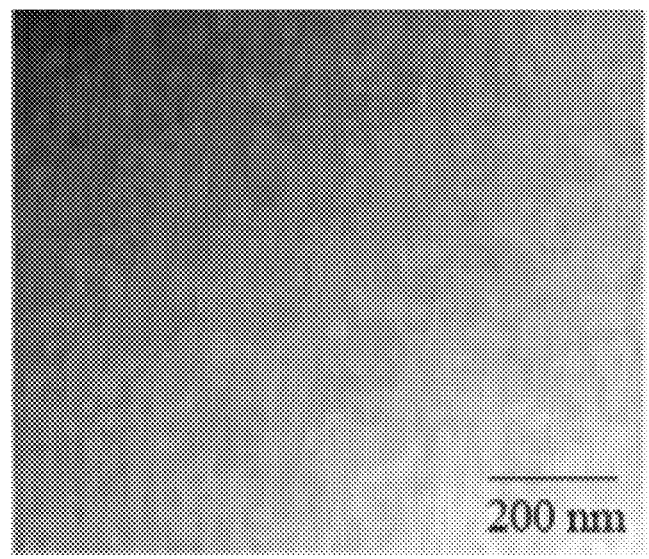
FIG. 12 is a micrograph of third reinforced partition walls which have been heat-treated for one hour at a temperature of 600° C. in a variation of the method for manufacturing a wire grid polarizer plate according to the invention.
Figure 13:
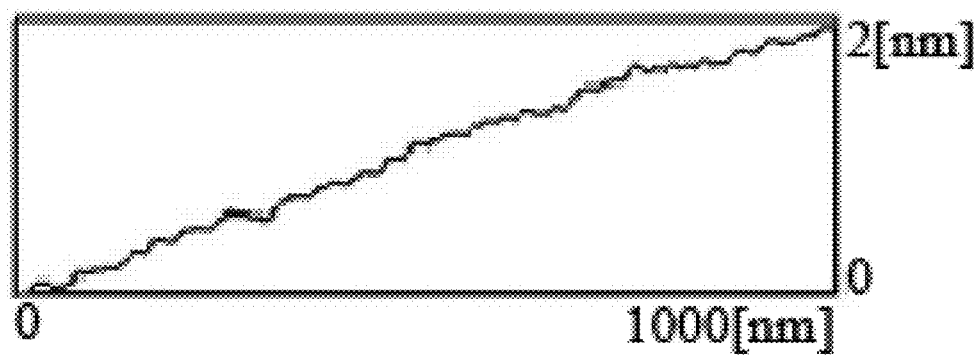
FIG. 13 is a cross-sectional profile of the third reinforced partition walls of FIG. 12.
Figure 14:
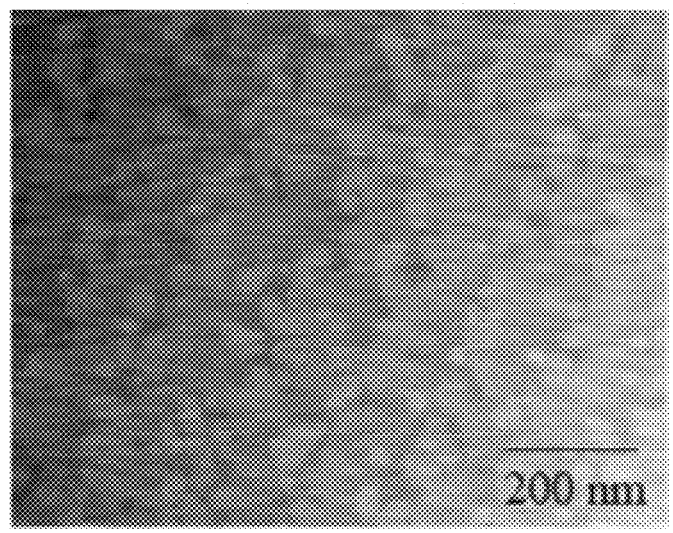
FIG. 14 is a micrograph of third reinforced partition walls which have been heat-treated for one hour at a temperature of 700° C. in another variation of the method for manufacturing a wire grid polarizer plate according to the invention.
Figure 15:
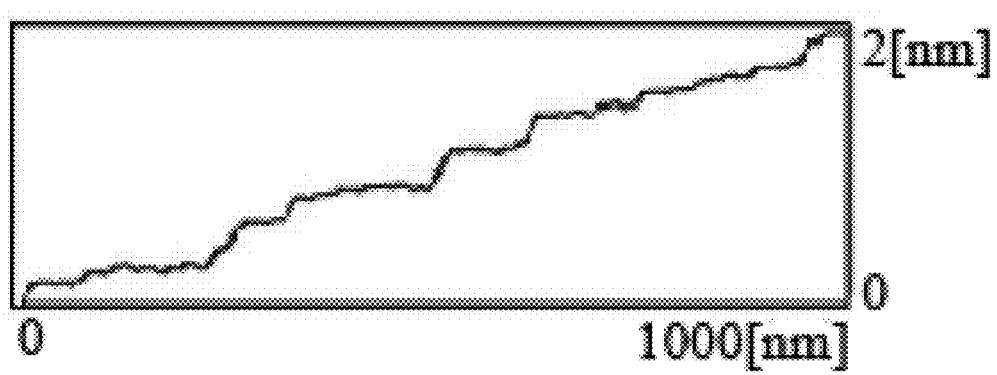
FIG. 15 is a cross-sectional profile of the third reinforced partition walls of FIG. 14.
Figure 16:
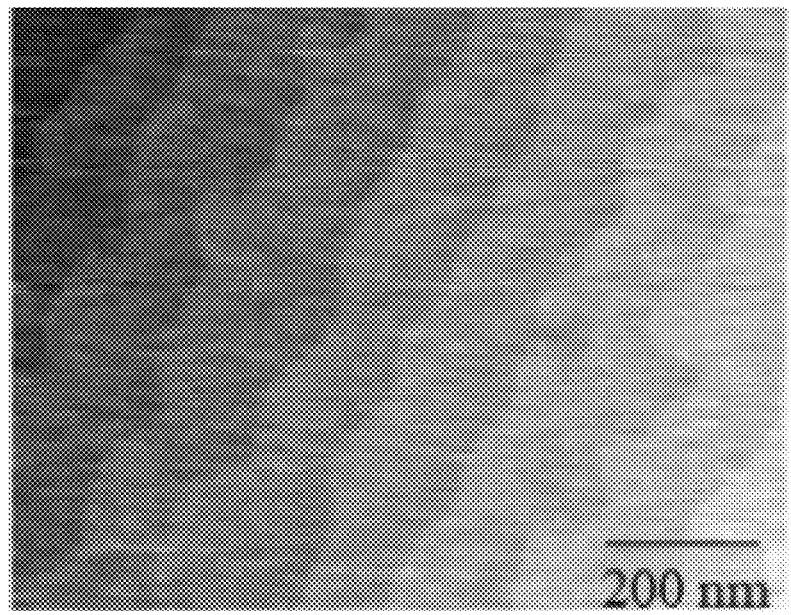
FIG. 16 is a micrograph of third reinforced partition walls which have been heat-treated for one hour at a temperature of 800° C. in still another variation of the method for manufacturing a wire grid polarizer plate according to the invention.
Figure 17:
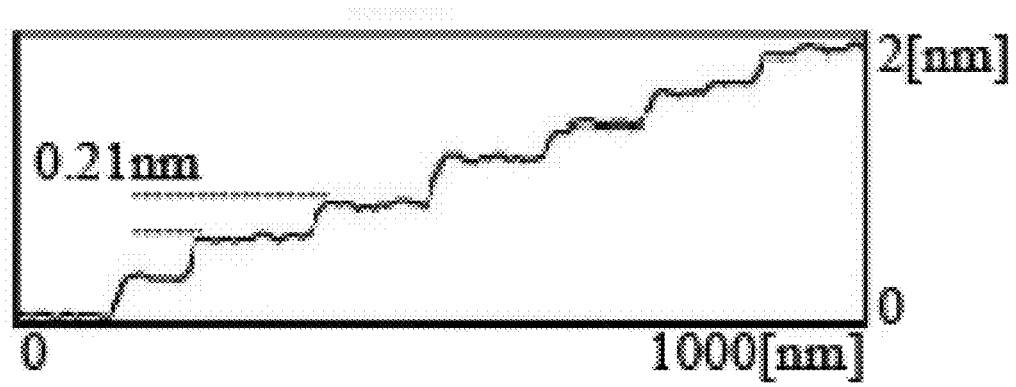
FIG. 17 is a cross-sectional profile of the third reinforced partition walls of FIG. 16.
Figure 18:
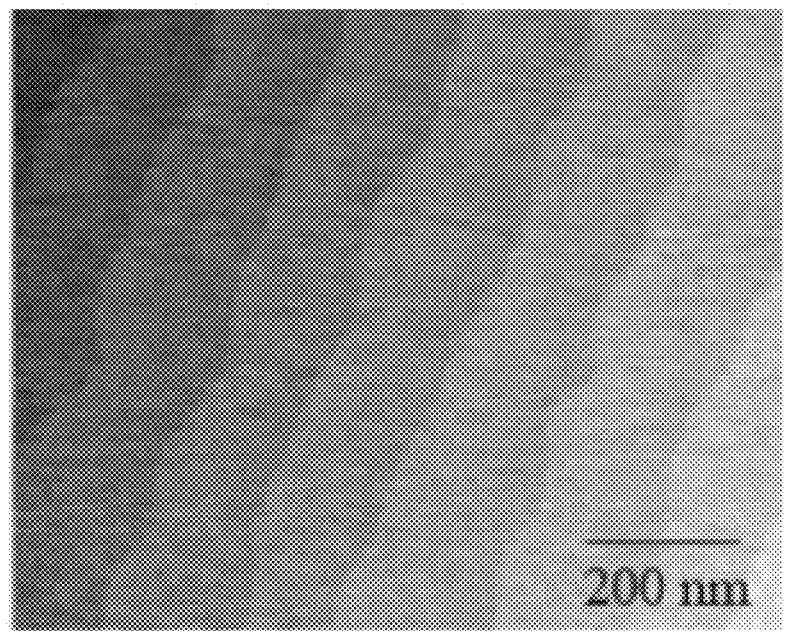
FIG. 18 is a micrograph of third reinforced partition walls which have been heat-treated for one hour at a temperature of 900° C. in yet another variation of the method for manufacturing a wire grid polarizer plate according to the invention.
Figure 19:
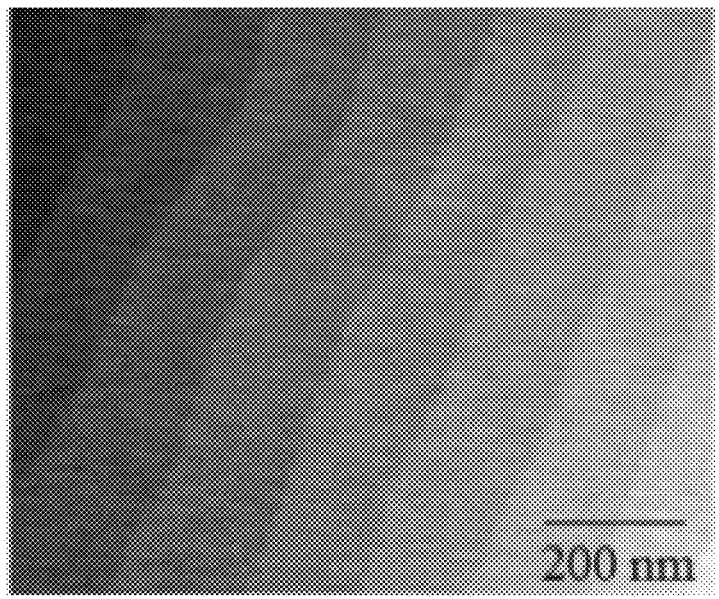
FIG. 19 is a micrograph of third reinforced partition walls which have been heat-treated for one hour at a temperature of 1000° C. in yet another variation of the method for manufacturing a wire grid polarizer plate according to the invention.

FIG. 11 is a micrograph of third reinforced aluminum oxide partition walls which have been formed by heat-treatment for one hour at a temperature of 500° C. FIG. 12 is a micrograph of third reinforced aluminum oxide partition walls which have been formed by heat-treatment for one hour at a temperature of 600° C. FIG. 13 is a cross-sectional profile of the third reinforced aluminum oxide partition walls of FIG. 12. FIG. 14 is a micrograph of third reinforced aluminum oxide partition walls which have been formed by heat-treatment for one hour at a temperature of 700° C. FIG. 15 is a cross-sectional profile of the third reinforced aluminum oxide partition walls of FIG. 14. FIG. 16 is a micrograph of third reinforced aluminum oxide partition walls which have been formed by heat-treatment for one hour at a temperature of 800° C. FIG. 17 is a cross-sectional profile of the third reinforced aluminum oxide partition walls of FIG. 16. FIG. 18 is a micrograph of third reinforced aluminum oxide partition walls which have been formed by heat-treatment for one hour at a temperature of 900° C. FIG. 19 is a micrograph of third reinforced aluminum oxide partition walls which have been formed by heat-treatment for one hour at a temperature of 1000° C.

Referring to FIGS. 11 to 19, it can be confirmed that as the heat treatment process was carried out at a temperature of 600° C. or more, the surface structure of the aluminum oxide material layer changed gradually until a wave pattern was observed. That is, when the heat treatment process was carried out for one hour at a temperature of 500° C., a wave pattern was not observed. However, when the heat treatment process was carried out for one hour at a temperature of 600° C. or more, it can be confirmed that the aluminum oxide material layer has a relatively dense microstructure and changed gradually until a wave pattern was observed. Further, it can be confirmed that as the heat treatment temperature was raised, a stepped line shown as a wave pattern in the drawing gradually approached a straight line.

Unlike a case where the heat treatment process on the aluminum oxide material layer was carried out for one hour at a temperature of 500° C. (see FIG. 11), when the heat treatment process on the aluminum oxide material layer was carried out for one hour at a temperature of 600° C. or more (see FIGS. 12-19), a stepped cross-sectional structure was gradually defined in the aluminum oxide material layer. When the heat treatment process on the aluminum oxide material layer was carried out at a temperature of 700° C. (FIG. 14), as the heat treatment temperature was raised, the stepped cross-sectional structure (see FIG. 15) became apparent. Particularly, when the heat treatment process on the aluminum oxide material layer was carried out for one hour at a temperature of 800° C. (see FIG. 16) or more, in the stepped cross-sectional structure, a difference at each step was observed as about 0.2 nm (see FIG. 17), and discrete island-like irregularities at each step were reduced. In one direction along a planar distance represented in the cross-sectional profile views, the stepped cross-sectional structure may one or increase or decrease in a maximum height thereof.

When the heat treatment process on the aluminum oxide material layer was carried out for one hour at a temperature of 500° C. (see FIG. 11), there were many irregularities on the substrate, and a measurement value of surface roughness was about 4 nm. When the heat treatment process on the aluminum oxide material layer was carried out at temperatures of 900° C. (FIG. 18) and 100° C. (see FIG. 19), discrete island-like irregularities were not observable. Where the discrete island-like irregularities were not observable, the wave pattern lengthwise extended in an extension direction was defined in the heat-treated aluminum oxide material layer.

Figure 20:
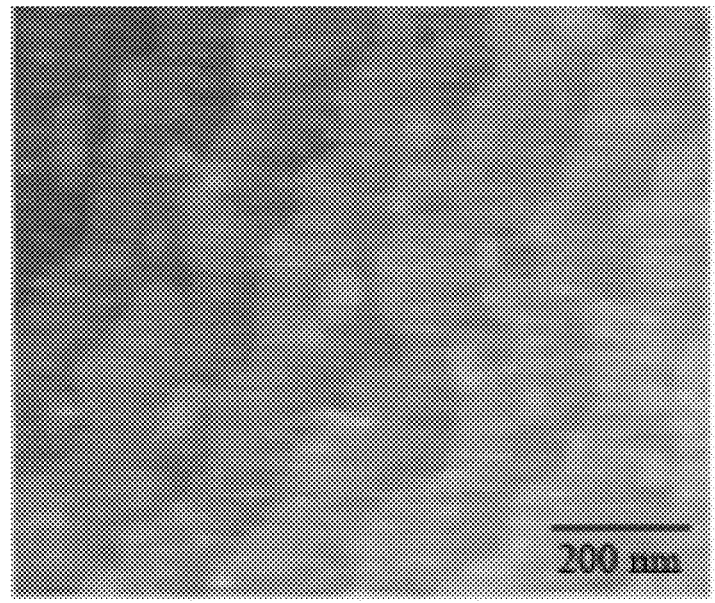
FIG. 20 is a micrograph of third reinforced partition walls which have been heat-treated for 10 minutes at a temperature of 1000° C. in yet another variation of the method for manufacturing a wire grid polarizer plate according to the invention.
Figure 21:
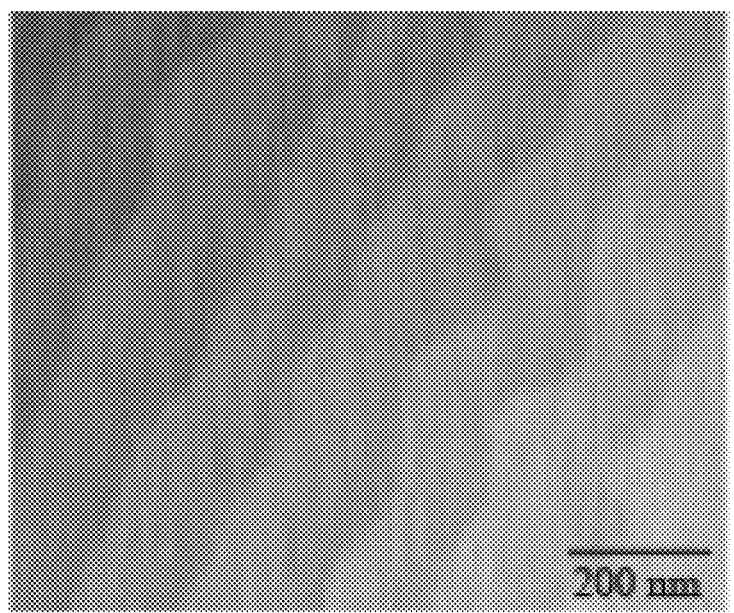
FIG. 21 is a micrograph of third reinforced partition walls which have been heat-treated for 30 minutes at a temperature of 1000° C. in yet another variation of the method for manufacturing a wire grid polarizer plate according to the invention.

FIGS. 20 and 21 respectively show micrographs when the aluminum oxide material layer was heat-treated at a temperature of 1000° C. at an atmospheric pressure in the air for 10 minutes and for 30 minutes according to the invention.

Referring to FIGS. 20 and 21, even when the aluminum oxide material layer was heat-treated at a temperature of 1000° C. for 10 minutes, wavy lines were observable. That is, a stepped cross-sectional structure began to be defined starting from when the aluminum oxide material layer was heat-treated at a temperature of 1000° C. for 10 minutes.

While the present disclosure has been particularly shown and described with reference to exemplary embodiments thereof, it will be understood by those of ordinary skill in the art that various changes in implementation and detail may be made therein without departing from the spirit and scope of the following claims. The exemplary embodiments should be considered in a descriptive sense only and not for purposes of limitation.

What is claimed is:

1. A method for manufacturing a wire grid polarizer plate, the method comprising:
   forming a first material layer including a first metal, on a transparent substrate;
   forming on the first material layer, a second material layer including a second metal having strength greater than that of the first metal;
   forming on the second material layer, a third material layer including an oxide of the first metal;
   forming from the third material layer, a third partition wall in plural spaced apart from each other on the second material layer by patterning the third material layer using a mask; and
   forming from the third partition walls, a third reinforced partition wall in plural and including the oxide of the first metal, the third reinforced partition walls having strength greater than the strength of the second metal and having a stepped cross-sectional structure by heat treatment of the third partition walls.

2. The method of claim 1, wherein the heat treatment is performed at a temperature ranging from about 600 degrees Celsius to about 1000 degrees Celsius, for more than one hour.

3. The method of claim 1, wherein the forming the first material layer, the forming the second material layer and the forming the third material layer are performed in a continuous deposition process.

4. The method of claim 1, further comprising forming from the second material layer, a second partition wall in plural spaced apart from each other on the first material layer, the second partition walls including of the second metal by patterning the second material layer using the third reinforced partition walls as a mask.

5. The method of claim 4, further comprising forming from the first material layer, a first partition wall provided in plural spaced apart from each other on the transparent substrate, the first partition walls including the first metal by patterning the first material layer using the third reinforced partition walls and the second partition walls as a mask.

6. The method of claim 5, wherein an angle between the first partition walls and the transparent substrate ranges from about 88 degrees to about 90 degrees.

7. The method of claim 1, wherein the first metal is one of aluminum (Al), chromium (Cr), gold (Au), silver (Ag), copper (Cu), nickel (Ni), an alloy thereof and a combination of the foregoing.

8. The method of claim 1, wherein the second metal is one of titanium (Ti), cobalt (Co), molybdenum (Mo), an alloy thereof and a combination of the foregoing.

9. The method of claim 1, wherein the heat treatment is performed at a temperature of about 1000 degrees Celsius, for more than ten minutes.

\* \* \* \* \*